US007211626B2

(12) United States Patent
Kobashi et al.

(10) Patent No.: US 7,211,626 B2
(45) Date of Patent: May 1, 2007

(54) STYRENIC RESIN COMPOSITION

(75) Inventors: Kazunori Kobashi, Sakura (JP); Hiroyuki Yamazaki, Yachimata (JP); Tsuyoshi Morita, Chiba (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/543,402

(22) PCT Filed: Jan. 23, 2004

(86) PCT No.: PCT/JP2004/000588

§ 371 (c)(1), (2), (4) Date: Aug. 22, 2006

(87) PCT Pub. No.: WO2004/067628

PCT Pub. Date: Aug. 12, 2004

(65) Prior Publication Data

US 2007/0027257 A1 Feb. 1, 2007

(30) Foreign Application Priority Data

Jan. 28, 2003 (JP) .............................. 2003-18681

(51) Int. Cl.
*C07L 53/02* (2006.01)

(52) U.S. Cl. ......................... 525/98; 525/86; 428/35.2; 428/36.92; 428/517

(58) Field of Classification Search .................. 525/86, 525/98; 428/35.2, 517, 36.92
See application file for complete search history.

(56) References Cited

U.S. PATENT DOCUMENTS 4,772,667 A * 9/1988 Biletch et al. .............. 525/243

FOREIGN PATENT DOCUMENTS

| | | |
|---|---|---|
| JP | 7-292191 | 11/1995 |
| JP | 7-292192 | 11/1995 |
| JP | 7-309992 | 11/1995 |
| JP | 11-71490 | 3/1999 |
| JP | 2002-226663 | 8/2002 |
| JP | 2002-226670 | 8/2002 |
| JP | 2003-33968 | 2/2003 |
| JP | 2003-94520 | 4/2003 |

OTHER PUBLICATIONS

International Search Report dated Apr. 27, 2004.

* cited by examiner

*Primary Examiner*—Fred Teskin
(74) *Attorney, Agent, or Firm*—Armstrong, Kratz, Quintos, Hanson & Brooks, LLP

(57) ABSTRACT

Surface impact strength in a molded article of an impact-resistant styrene resin composition, and balance between the surface impact strength and the rigidity is improved. Disclosed is a styrene resin composition comprising a styrene copolymer (A), and a block copolymer (B) comprising a polymer block (b1) of a styrene monomer and a polymer block (b2) of a conjugated diene monomer, wherein the styrene copolymer (A) is a copolymer of a styrene monomer (a), a butyl acrylate (b) and a methyl methacrylate (c), the block copolymer (B) forms a multi-layered structure in which a layer of the polymer block (b1) and a layer of the polymer block (b2) of the diene monomer are alternately laminated, and the styrene resin composition has 9 to 25%, on a weight basis, of structural units derived from the conjugated diene monomer.

6 Claims, 2 Drawing Sheets

1
2
3
4
5
6
7
8
9
10
11
(I)
(II)

STYRENIC RESIN COMPOSITION

TECHNICAL FIELD

The present invention relates to a novel styrene resin composition obtained by mixing a styrene resin with a thermoplastic elastomer.

BACKGROUND ART

Styrene resins have been widely used for plastic containers because of superior formability. Taking into account problems such as effects on the environment, vinyl chloride resins have recently been replaced by styrene resins in the field of plastic containers, and a so-called impact-resistant styrene resin composition obtained by mixing a styrene resin with a thermoplastic elastomer has been widely used in forming sheets obtained by vacuum molding and press forming the styrene resin sheets. However, increase in the content of the thermoplastic elastomer in an impact-resistant styrene resin composition leads to reduction in the rigidity of the forming sheet, although the impact resistance thereof is enhanced, and makes the resulting molded article subject to deformation when high loads are applied from the outside, thereby tending to cause damage of goods contained inside in the case of a container for packing the goods. On the other hand, when the content of the thermoplastic elastomer in the impact-resistant styrene resin composition is decreased, the molded article has low impact strength, although the rigidity is enhanced, and thus the molded article is likely to crack, fracture, and break. Therefore, there have been attempts to achieve good balance between the rigidity and the impact resistance, which conflict with each other. For example, there has been known a transparent impact-resistant resin composition comprising a styrene-butadiene block copolymer containing 65 to 85% by weight of a styrene block, and a styrene-butyl acrylate copolymer, and a styrene-butadiene block copolymer containing 10 to 50% by weight of a styrene block (see, for example, Japanese Patent Application, First Publication No. Hei 7-309992).

Although the transparent impact-resistant resin composition can impart excellent rigidity and excellent impact resistance to a molded article of the composition, the resulting molded article has insufficient surface impact strength, and various secondarily formed articles such as blister packs, carrier tapes and containers for food obtained by secondarily forming a forming sheet are likely to break and crack by vibration upon dropping or transportation when containing goods.

DISCLOSURE OF INVENTION

Objects of the present invention are to remarkably improve surface impact strength in a molded article of an impact-resistant styrene resin composition and to improve a balance between the surface impact strength and the rigidity.

The present inventors have intensively researched to achieve the above objects and have found that, when using a styrene resin composition comprising a styrene copolymer (A), and a block copolymer (B) comprising a polymer block (b1) of a styrene monomer and a polymer block (b2) of a conjugated diene monomer, wherein the styrene copolymer (A) is a ternary copolymer of a styrene monomer (a), a butyl acrylate (b) and a methyl methacrylate (c), the block copolymer (B) can have a predetermined morphology in the composition, the styrene resin composition has, on a weight basis, 9 to 25% of structural units derived from the conjugated diene monomer, 1.5 to 6% of structural units derived from the methyl methacrylate (c) and 2.8 to 9.5% of structural units derived from the butyl acrylate (b), the resulting molded article exhibits excellent rigidity and remarkably improved surface impact strength, and thus the present invention has been completed.

The present invention is directed to a styrene resin composition comprising a styrene copolymer (A), and a block copolymer (B) comprising a polymer block (b1) of a styrene monomer and a polymer block (b2) of a conjugated diene monomer, wherein the styrene copolymer (A) is a copolymer of a styrene monomer (a), a butyl acrylate (b) and a methyl methacrylate (c), the block copolymer (B) has an alternative multi-layered structure comprising the polymer block (b1) and a layer of the polymer block (b2) of the diene monomer are alternately laminated, and the styrene resin composition has, on a weight basis, 9 to 25% of structural units derived from the conjugated diene monomer, 2.8 to 9.5% of structural units derived from the butyl acrylate (b), and 1.5 to 6% of structural units derived from the methyl methacrylate (c), based on the total amount of the styrene resin composition.

The present invention is also directed to a forming sheet made of the styrene resin composition.

The present invention is also directed to a blister pack made of the styrene resin composition.

BEST MODE FOR CARRYING OUT THE INVENTION

Figure 1:
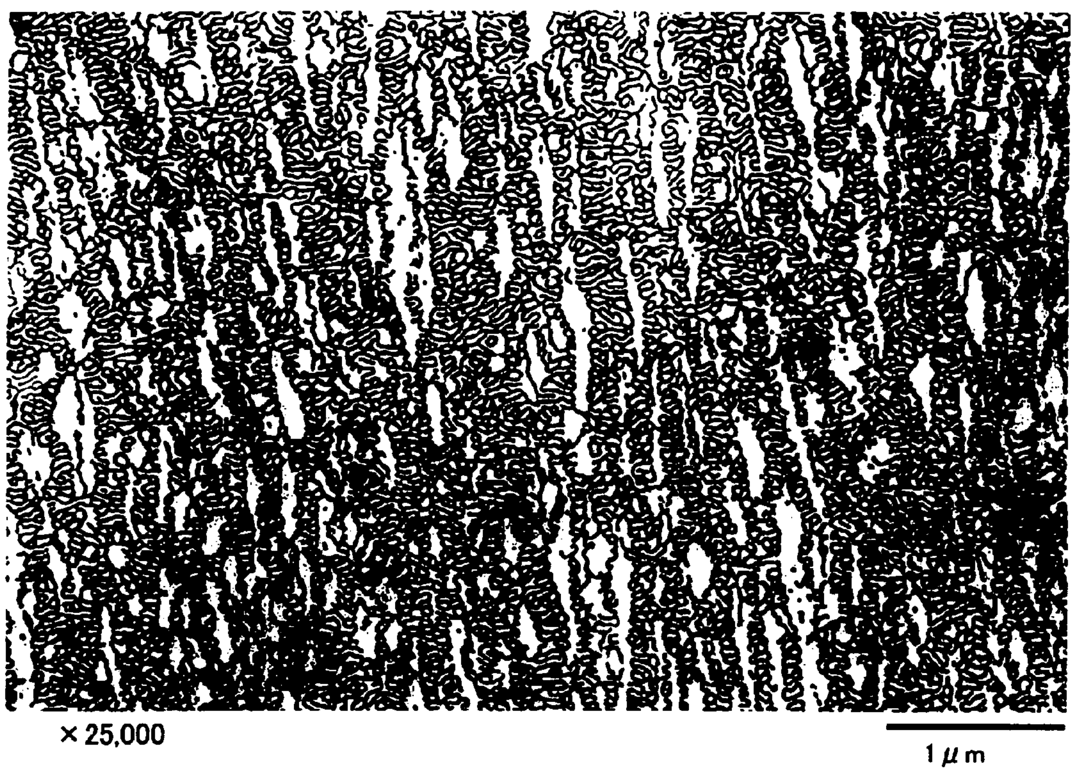
FIG. 1 is a transmission electron micrograph (TEM) of a styrene resin composition obtained in Example 3.

As described above, the transparent styrene resin of the present invention comprises a styrene copolymer (A), and a block copolymer (B) comprising a polymer block (b1) of a styrene monomer and a polymer block (b2) of a conjugated diene monomer, and the styrene copolymer (A) is composed of a styrene monomer (a), a butyl acrylate (b) and a methyl methacrylate (c). The block copolymer (B) has an alternative multi-layered structure in which a layer of the polymer block (b1) and a layer of the polymer block (b2) of the diene monomer are laminated alternatively. The styrene copolymer (A) is provided between layers comprised in the alternative multi-layered structure such that it penetrates into the layers of the multi-layered structure to form a continuous layer. Herein, morphology wherein the styrene copolymer (A) forms the continuous layer and the block copolymer (B) forms the alternative multi-layered structure can be specifically confirmed by a transmission electron micrograph (TEM) shown in FIG. 1. In FIG. 1, the dark portion corresponds to the layer of the polymer block (b2) of the conjugated diene monomer in the block copolymer (B), while the void portion surrounded by the layer corresponds to the layer of the polymer block (b1) of the styrene monomer.

The block copolymer (B) composed of the polymer block (b1) of the styrene monomer and the polymer block (b2) of the conjugated diene monomer itself has a alternative multi-layered structure comprising the polymer block (b1) in the block copolymer (B) and the layer of the polymer block (b2) of the conjugated diene monomer. In the present invention, it is made possible to improve the surface impact strength by allowing the styrene copolymer (A) to exist as a continuous layer between layers of a plurality of layers of the polymer block (b2) of the conjugated diene monomer, minimizing the breakage of the alternative multi-layered structure. In contrast, in the case of the prior art wherein SBS is used as a block copolymer and a copolymer of a styrene monomer and a butyl acrylate is used as a continuous layer, since the copolymer is easily compatible with the block copolymer, the morphology of SBS is broken, thereby the surface impact strength of the above-described molded article, especially the surface impact strength of the molded article obtained by secondarily forming a forming sheet, results in an insufficient level.

In the present invention, it is made possible to exhibit the proper morphology described above in order to achieve a good balance between the surface impact strength and the rigidity by using the methyl methacrylate (c) as the monomer component of the styrene copolymer (A) constituting the continuous layer and controlling the content of structural units derived from the conjugated diene monomer in the styrene resin composition within a range from 9 to 25% on a weight basis. As used herein, the structural units derived from the conjugated diene monomer refer to alkylene structural units obtained by the addition reaction of the conjugated diene monomer. For example, when using 1,3-butadiene as the conjugated diene monomer, the structural units represent but-2-ene-1,4-diyl and but-3-ene-1,2-diyl.

To form such a proper morphology, the content of structural units derived from the methyl methacrylate (c) in the styrene resin composition is preferably controlled within a range from 1.5 to 6% on a weight basis. As used herein, the structural units derived from the methyl methacrylate (c) refer to structural units obtained by the addition reaction of the methyl methacrylate (c) and are specifically 1-methyl-1-methyloxycarbonyl-ethylene.

The content of structural units derived from the butyl acrylate (b) also exerts an influence on formation of the morphology of the styrene resin composition and the proportion of the multi-layered structure tends to decrease as the content of the structural units increases. Although the proportion of the multi-layered structure tends to increase as the content of the structural units decreases, the rigidity deteriorates. For the above reason, the content of structural units derived from the butyl acrylate (b) in the styrene resin composition is preferably controlled within a range from 2.8 to 8.5% on a weight basis. As used herein, the structural units derived from the butyl acrylate (b) refers to structural units obtained by the addition reaction of the butyl acrylate (b) and are specifically 1-butyloxycarbonyl-ethylene.

The contents of the structural units derived from the conjugated diene monomer, the structural units derived from the methyl methacrylate (c) and the structural units derived from the butyl acrylate (b) in the styrene resin composition can be determined from an area ratio of a chemical peak corresponding to carbon atoms which are peculiar to the respective structural units in the measurement of $C^{13}$-NMR. For example, in the case of the structural units derived from the methyl methacrylate (b), the content of the structural units can be determined from an area ratio of a peak of a chemical shift (175 ppm) of carbonyl carbon atoms. In the case of the structural units derived from the butyl acrylate (b), the content of the structural units can be determined from an area ratio of a peak of a chemical shift (63 ppm) of carbon atoms of a butyl group bonded with oxygen atoms.

In a transparent styrene resin composition of the present invention, the styrene copolymer (A) constituting the continuous layer is a copolymer of the styrene monomer (a), the butyl acrylate (b) and the methyl methacrylate (c). As described above, flexibility can be imparted to the composition by using the butyl acrylate (b) as the copolymer component of the styrene monomer (a) and compatibilization with the styrene-butadiene block copolymer (B), and also morphology of the block copolymer (B) can be retained by using the methyl methacrylate (c).

Examples of the styrene monomer constituting the styrene copolymer (A) include styrene, α-methylstyrene, o-methylstyrene, m-methylstyrene, p-methylstyrene, ethylstyrene, isobutylstyrene, t-butylstyrene, o-bromostyrene, m-bromostyrene, p-bromostyrene, o-chlorostyrene, m-chlorostyrene, and p-chlorostyrene. Among these styrene monomers, styrene is preferable because it has good reactivity and is easily polymerized.

The copolymer (A) is preferably a copolymer comprising 78 to 85% by weight of a styrene monomer (a), 6 to 19% by weight of a butyl acrylate (b), and 3 to 16% by weight of a methyl methacrylate (c), based on the total amount of the copolymer (A). As described hereinafter, the content of the polybutadiene block in the block copolymer (B) is preferably from 20 to 30% by weight in view of the surface impact strength of the molded article, based on the total amount of the block copolymer (B). By controlling the proportion of the raw monomer of the styrene copolymer (A) within the above range of 78 to 85% by weight, excellent transparency can be imparted to the molded article, and in addition, good balance between the surface impact strength and the rigidity is achieved. It is particularly preferable, in view of the transparency of the molded article, to control the proportion of the monomer so as to reduce a difference in refractive index between the styrene copolymer and the block copolymer (B) to 0.002 or less. By using the methyl methacrylate (c) in the above proportion of 3 to 16% by weight, excellent heat resistance can be imparted to the molded article, and thus excellent rigidity and excellent surface impact strength can be exhibited in use in high-temperature area and use in the summer. Furthermore, by using the methyl methacrylate (c) in the above proportion, proper fluidity is exhibited upon melting while maintaining the molecular weight of the styrene copolymer (A) at a relatively low value, thereby making it possible to exhibit good molding ability. Therefore, the resulting continuous layer made of the styrene copolymer (A) has proper flexibility and thus whitening on bending of the forming sheet can be prevented. From such a point of view, the styrene copolymer (A) is preferably a styrene copolymer having a weight average molecular weight of $25\times10^4$ to $35\times10^4$, and a melt mass flow rate is preferably from 5 to 12 g/10 min. As described above, since the styrene copolymer (A) can exhibit proper fluidity while maintaining the molecular weight at a low value, the temperature upon melt-kneading of the styrene copolymer (A) and the block copolymer (B) can be reduced. As a result, gelation upon melt-kneading can be prevented from occurring and the finally obtained molded article has excellent appearance.

Such a styrene copolymer (A) can be produced by polymerizing the styrene monomer (a), the butyl acrylate (b), and the methyl methacrylate (c) in a predetermined weight ratio. Examples of the polymerization method are a suspension polymerization method, a bulk suspension polymerization method, a solution polymerization method, and a bulk polymerization method; however, a continuous bulk polymerization method is preferable in view of productivity, cost, and uniformity of the composition.

In the present invention, among the continuous bulk polymerization methods, particularly preferred is a continuous bulk polymerization method using a polymerization apparatus comprising a polymerization line in which plural tubular reactors with static mixing elements are incorporated in series because the homogeneous styrene copolymer (A) can be efficiently produced.

The mixing elements used herein include, for example, those that divide the polymerization solution that has flowed into the tube, and change the direction of its flow and repeat such a division and combination to mix the polymerization solution. Such a tubular reactor includes, for example, SMX model and SMR model Sulzer tubular mixers, Koenigs static mixers, Toray tubular mixers, etc.

According to the continuous bulk polymerization method, raw components are preferably prepolymerized in the stirring type reactor before introduction into the polymerization apparatus, and then the polymerization liquid is continuously introduced in the polymerization apparatus constituting the continuous bulk polymerization line because uniformity of the styrene copolymer (A) is further enhanced. The stirring type reactor includes, for example, a stirring tank reactor, a stirring tower reactor, etc., and the stirring blade includes, for example, anchor type, turbine type, screw type, double helical type, and logborn type blades. In the case in which the respective raw components are polymerized in the continuous polymerization line comprising the stirring type reactor connected to the continuous bulk polymerization apparatus, the temperature is preferably from 120 to 135° C. at a polymerization initial stage where a polymerization conversion ratio is from 35 to 55% by weight, or the temperature is preferably from 140 to 160° C. at the subsequent polymerization stage. When the above temperature conditions are satisfied, the molecular weight of the resulting styrene copolymer (A) can be easily controlled, and the productivity can be improved.

After the completion of the polymerization, the polymerization solution is preheated in a preheater and is sent to a devolatilizing bath and, after removing the unreacted monomer and solvent under reduced pressure, the polymerization solution is pelletized to obtain the desired styrene copolymer (A).

In the continuous bulk polymerization method, a solvent may be used so as to reduce the viscosity of the polymerization solution in the tubular reactor. In this case, the amount of the solvent is within a range from 5 to 20 parts by weight based on 100 parts by weight of the total of the respective raw components. For example, ethylbenzene, toluene and xylene, which are used in the bulk polymerization method, are suitable for use as the solvent. A chain transfer agent is preferably added so as to adjust the molecular weight of the styrene copolymer (A). The amount of the chain transfer agent is usually within a range from 0.005 to 0.5 parts by weight based on 100 parts by weight of the total of the respective raw monomers.

In the production of the styrene copolymer (A), a polymerization initiator can be appropriately used. As the polymerization initiator, any conventional peroxide-based polymerization initiators can be used. In the present invention, among known peroxide polymerization initiators, 2,2-bis(4,4-di-t-butylperoxycyclohexyl)propane is preferable because the styrene copolymer (A) can be three-dimensionally polymerized and a neck-in phenomenon upon extrusion of the sheet can be prevented.

Examples of the block copolymer (B) composed of a polymer block (b1) of a styrene monomer and a polymer block (b2) of a conjugated diene monomer include:

(1) a diblock copolymer comprising a polymer block (b1) of a styrene monomer and a polymer block (b2) of a conjugated diene monomer, (2) a triblock copolymer comprising a polymer block (b1) of a styrene monomer and a polymer block (b2) of a conjugated diene monomer, and a polymer block (b1) of a styrene monomer, (3) a hydrogenated compound of the triblock copolymer, (4) a polyblock copolymer consisting of plural polymer blocks higher than triblocks, comprising a polymer block (b1) of plural styrene monomers and a polymer block (b1) of a styrene monomer, and (5) a block copolymer comprising a polymer block (b1) of a styrene monomer and a polymer block (b2) of a conjugated diene monomer, and a block copolymer having a random copolymer moiety.

Among these copolymers, the triblock copolymer (2) is preferable because it is morphologically excellent in surface impact resistance of the rubbery polymer (B). With respect to the triblock copolymer, the conjugated diene monomer may be partially copolymerized with the polymer block (b1) of the styrene monomer, or the styrene monomer may be partially copolymerized with the polymer block (b2) of the conjugated diene monomer.

Examples of the styrene monomer constituting the polymer block (b1) include styrene, α-methylstyrene, o-methylstyrene, m-methylstyrene, p-methylstyrene, ethylstyrene, isobutylstyrene, t-butylstyrene, o-bromostyrene, m-bromostyrene, p-bromostyrene, o-chlorostyrene, m-chlorostyrene, and p-chlorostyrene. In the present invention, styrene is preferable because the above alternately laminated state is easily formed.

Examples of the conjugated diene monomer constituting the polymer block (b2) include diene monomers such as butadiene, chloroprene, isoprene, and 1,3-pentadiene. Among these monomers, a polybutadiene block copolymer is preferable because it is excellent in rubber elasticity exhibited by the polymer block (b2) and excellent surface impact strength can be imparted to the finally obtained styrene resin composition of the present invention.

Therefore, the block copolymer (B) is preferably a so-called styrene-butadiene copolymer (SBR) or a triblock type styrene-butadiene-styrene copolymer (SBS), and the styrene-butadiene-styrene copolymer (SBS) is particularly preferable in view of surface impact strength.

When the content of the polymer block (b2) of the conjugated diene monomer in the block copolymer (B) increases, the block copolymer (B) has enhanced rubbery properties and plastic deformation hardly arises upon processing. Therefore, the content of the polymer block (b2) of the conjugated diene monomer in the block copolymer (B) is preferably from 20 to 30% by weight.

The block copolymer (B) described in detail above can be produced by polymerizing a styrene monomer with a conjugated diene monomer using a known method such as emulsion polymerization or solution polymerization method. The triblock copolymer is preferably produced by a method of solution-polymerizing a styrene monomer with a diene monomer in a hydrocarbon organic solvent in the presence of an anionic polymerization initiator such as organolithium compound because the molecular weight of the block copolymer (B) can be easily increased.

The styrene resin composition of the present invention can be obtained by melt-kneading the styrene copolymer (A) with the block copolymer (B). In the present invention, by melt-kneading the two, it is made possible to allow the styrene copolymer (A) to exist as a continuous layer between layers of the polymer block (b1) of the styrene monomer and layers of the polymer block (b2) of the conjugated diene monomer, which are alternately laminated, without breaking the morphology of the block copolymer (B).

In this case, as described above, a mixing ratio of the styrene copolymer (A) to the block copolymer (B) is controlled so that the content of the structural units derived from the conjugated diene monomer, as raw components of the block copolymer (B), in the styrene resin composition is from 9 to 25% by weight. When the content of the structural units derived from the conjugated diene monomer in the styrene resin composition of the present invention is less than 9% by weight, sufficient surface impact strength cannot be imparted to the molded article. On the other hand, when the content exceeds 25% by weight, the composition itself has insufficient rigidity and drawdown is likely to occur when secondarily forming the forming sheet. The content is particularly preferably within a range from 14 to 25% by weight because a remarkable effect of improving the surface impact strength is exerted. The styrene copolymer (A) is preferably mixed with the block copolymer (B) so that the content of the structural units derived from the methyl methacrylate (c) in the styrene resin composition is within a range from 1.5 to 6% by weight and the content of the structural units derived from the butyl acrylate (b) in the styrene resin composition is within a range from 2.8 to 9.5% by weight.

As used herein, the structural units derived from the conjugated diene monomer refer to alkylene structural units obtained by the addition reaction of the conjugated diene monomer. For example, when using 1,3-butadiene as the conjugated diene monomer, the structural units represent but-2-ene-1,4-diyl and but-3-ene-1,2-diyl. Also the content of the structural units in the styrene resin composition can be determined from an area ratio of a chemical peak corresponding to carbon atoms which are peculiar to the respective structural units in the measurement of $C^{13}$-NMR. The content can be determined from an area ratio of a peak of a chemical shift (114 ppm) of terminal carbon atoms constituting a 1,2-vinyl group in the case of but-3-ene-1,2-diyl, and the content can be determined from an area ratio of a peak of a chemical shift (125 to 132 ppm) of terminal carbon atoms in the case of but-2-ene-1,4-diyl.

Specific method of melt-kneading the styrene copolymer (A) with the block copolymer (B) includes, for example, a method of uniformly dry-blending the two using a mixer, charging the mixture in an extruder and melt-kneading the mixture, and a method of charging the styrene copolymer (A) and the block copolymer (B) in an extruder and melt-kneading them.

For example, there can also be used a method of previously dry-blending pellets or pearls of the styrene copolymer (A) and the block copolymer (B) using a mixer such as a Banbury mixer, charging the resulting mixture in an extruder, or directly charging the pellets or pearls in the extruder, and melt-kneading them in the extruder at 190 to 240° C. The melt-kneaded mixture may be formed into a sheet, or the mixture may be once pelletized and the resulting pellets be melt-formed into a sheet using an extruder. Melt-kneading is conducted using a single screw kneader, a twin screw kneader, a kneader, or an open roller. The resin temperature upon extrusion is preferably a melting temperature of the styrene copolymer (A) and the block copolymer (B) and is lower than 210° C. in order to inhibit formation of a gel and to improve the appearance of the molded article at the same.

In the present invention, in the case of polymerizing the respective raw components to obtain the styrene copolymer (A) and the block copolymer (B), or in the case of melt-kneading the two, various additives such as antioxidants, releasants, ultraviolet absorbers, colorants, heat stabilizers, plasticizers, and dyes can be appropriately added. These additives can be added during kneading or polymerization of the respective polymers. Specific examples of the additive include plasticizers such as mineral oil, ester-based plastizer and polyester-based plasticizer, antioxidants, chain transfer agents, higher fatty acids, high fatty acid esters, metal salts of higher fatty acids, and silicone oil, and one or more kinds thereof can be used in combination.

In the present invention, for the purpose of further improving the surface impact strength, it is made possible to add a block copolymer comprising a polymer block of a styrene monomer having 50% by weight or less of structural units derived from the styrene monomer, and a polymer block of a conjugated diene monomer in the styrene resin composition in the proportion of 2 to 15% by weight.

Examples of the method of producing a forming sheet from the styrene resin composition of the present invention includes, for example, a method of melt-kneading the styrene copolymer (A) with the block copolymer (B) and extruding the mixture through a T-die, and a method of forming a film by a calendering method or an inflation extrusion method. As described above, there can be produced a sheet having a thickness of 0.02 to 3 mm, and preferably 0.03 to 1 mm, which is suitable for secondary forming.

The forming sheet thus obtained is excellent in transparency, surface impact strength, rigidity, resistance to whitening on bending, and formability. Regarding the transparency, a 0.4 mm thick sheet exhibits a Haze value of 5 or less according to JIS K7105. Regarding the surface impact strength, a 0.4 mm thick sheet exhibits a DuPont impact strength of 0.8 J or higher, which has not previously been achieved. The heat resistance of the molded article is improved, and thus no deformation occurs under the conditions of high temperature and high humidity (after standing at a temperature of 65° C. and a humidity of 80% for 8 hours).

In the present invention, the forming sheet can be further formed into a desired shape by a pressure molding or a heat-pressure molding technique. The forming sheet is suitable for use as blister packs, trays for packing foods, cover materials, cups, various trays for storage, carrier tapes, and shrink films because it is excellent in resistance to whitening on bending, and has a balance between the surface impact strength, and rigidity. In particular, the forming sheet is suitable for use as blister packs because it is excellent in resistance to whitening on bending, and has heat resistance.

The styrene resin composition of the present invention can also be applied to shrink films. The shrink film can be produced by melt-kneading the styrene resin composition of the present invention, extruding the kneaded mixture and monoaxially stretching the extrudate.

The stretching method in the production of the shrink film is not specifically limited, and there can be preferably used a method of monoaxially or biaxially stretching, simultaneously or successively.

In the case of flat-shaped monoaxial stretching, there can be used a method of stretching in an extrusion direction by means of a difference in speed between heat rollers, or a method of independently stretching in a direction perpendicular to the extrusion direction using a tenter. In the case of biaxial stretching, there can be used a method of longitudinally stretching in an extrusion direction by means of a difference in speed between heat rolls and stretching in a lateral direction using a tenter, or a method of simultaneously stretching in lateral and longitudinal directions in a tenter.

In the case of cyclic monoaxial stretching, there can be used a method of stretching in an extrusion direction while inhibiting expansion of bubbles in a section diameter direction and controlling a draft ratio. In the case of cyclic biaxial stretching, there can be used a method of stretching in an extrusion direction and stretching simultaneously or successively in a section diameter direction of bubbles while blowing air into the bubbles of the cylindrically extruded sheet.

Since the transparent styrene resin composition of the present invention has excellent rigidity, surface impact resistance, moldability and transparency, it can be applied to various uses for moldings such as injection molding, contour extrusion molding, vacuum molding and pressure molding, in addition to uses such as sheet and shrink film, and also can be used as housings and parts of household electric appliances, various parts of office automation equipment, stationery articles, and general merchandise.

EXAMPLES

The present invention will be described in detail by way of the following examples; however, the present invention is not limited thereto. In the examples, parts and percentages are by weight unless otherwise specified.

[Production of Styrene Copolymer (A)]

Figure 3:
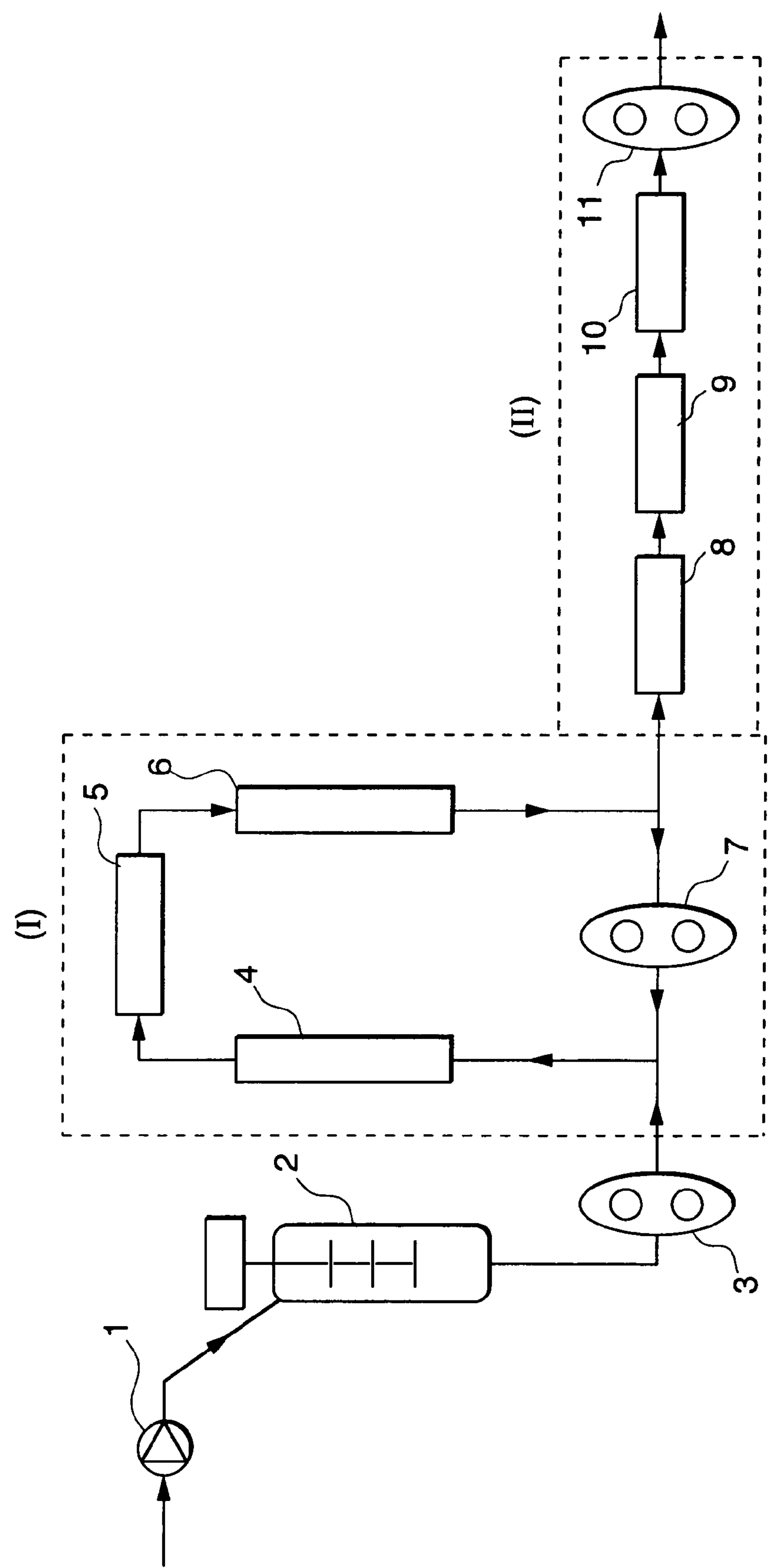
FIG. 3 is a flow chart showing an example of a continuous bulk polymerization line having incorporated tubular reactors with mixing elements.

In the production of a styrene copolymer (A), a continuous polymerization apparatus is equipped with a polymerization line as shown in the flow chart in FIG. 3. The polymerization apparatus is composed of a plunger pump (1), a stirring type reactor (2), gear pumps (3), (7) and (11), and tubular reactors (4), (5), (6), (8), (9) and (10), each having therein a mixing element. In FIG. 3, the arrow indicates the direction of liquid flow of a polymerization liquid and raw components are sent by the plunger pump (1) to the stirring type reactor (2), are subjected to initial graft polymerization while stirring, are introduced into a circulation polymerization line (I) composed of the tubular reactors (4), (5), (6) and the gear pump (7) by the gear pump (3), and then the polymerization liquid is polymerized in the circulation polymerization line (I) while circulating. The tubular reactors (8), (9) and (10) and the gear pump (11) forms a non-circulation polymerization line (II), and a portion of the polymerization liquid in the circulation line (I) flows into the polymerization line (II) and is then polymerized to the desired polymerization degree in the polymerization line (II).

The polymerization in the circulation polymerization line (I) is conducted until the total polymerization conversion ratio of the styrene monomer (a), the butyl acrylate (b) and the methyl methacrylate (c) at an outlet of the circulation polymerization line (I) becomes 35 to 55% by weight, and preferably 40 to 50% by weight. A ratio of a flow rate of the polymerization liquid circulation in the circulation polymerization line (I) to a flow rate of the polymerization liquid which flows into the non-circulation polymerization line (II), a reflux ratio R (=F1/F2, where F1 denotes a flow rate (liter/hour) of the mixed solution refluxed in the circulation polymerization line (I) without flowing into the polymerization line (II), and F2 denotes a flow rate (liter/hour) of the mixed solution which flows into the non-circulation polymerization line (II) from the circulation polymerization line (I)) is usually controlled within a range from 3 to 15.

After the completion of the polymerization, the polymerization solution is sent to a preheater by the gear pump (11), then to a devolatilizing bath and, after removing the unreacted monomer and the solvent under reduced pressure, the polymerization solution is pelletized to obtain the desired styrene copolymer (A).

(Production of Styrene Copolymer (A-1))

A mixed solution of 82 parts of styrene (SM), 12 parts of butyl acrylate (BuA), 6 parts of methyl methacrylate (MMA) and 8 parts of ethylbenzene was prepared and, after adding 2,2-bis(4,4-di-peroxycyclohexyl)propane, as a polymerization initiator, in an amount of 0.025 parts based on 100 parts of the monomer mixture and n-dodecylmercaptane, as a chain transfer agent, in an amount of 0.01 parts based on 100 parts of the monomer mixture, the solution was continuously bulk-polymerized under the following conditions using the above polymerization apparatus.

Reaction temperature in the stirring type reactor (2): 115° C.

Reaction temperature in the circulation polymerization line (I): 132° C.

Reaction temperature in the polymerization line (II): 150° C.

The mixed solution obtained by the polymerization was heated to 215° C. by a heat exchanger and, after removing the volatile component under reduced pressure, the polymerization solution was pelletized to obtain the desired styrene copolymer (A-1). Physical properties of the resulting styrene copolymer are shown in Table 1.

(Production of Styrene Copolymer (A-2))

In the same manner as in the case of the production of the styrene copolymer (A-1), except for adding 2,2-bis(4,4-di-peroxycyclohexyl)propane, as a polymerization initiator, in an amount of 0.025 parts based on 100 parts of the monomer mixture and n-dodecylmercaptane, as a chain transfer agent, in an amount of 0.02 parts based on 100 parts of the monomer mixture to a mixed solution of 82 parts of styrene (SM), 12 parts of butyl acrylate (BuA), 6 parts of methyl methacrylate (MMA) and 9 parts of ethylbenzene, a styrene copolymer (A-2) was obtained. Physical properties of the resulting styrene copolymer are shown in Table 1.

(Production of Styrene Copolymer (A-3))

In the same manner as in the case of the production of the styrene copolymer (A-1), except for adding 2,2-bis(4,4-di-peroxycyclohexyl)propane, as a polymerization initiator, in an amount of 0.025 parts based on 100 parts of the monomer mixture and n-dodecylmercaptane, as a chain transfer agent, in an amount of 0.03 parts based on 100 parts of the monomer mixture to a mixed solution of 82 parts of styrene (SM), 8 parts of butyl acrylate (BuA), 10 parts of methyl methacrylate (MMA) and 9 parts of ethylbenzene, a styrene copolymer (A-3) was obtained. Physical properties of the resulting styrene copolymer are shown in Table 1.

(Production of Styrene Copolymer (A-4))

A mixed solution of 82 parts of styrene (SM), 5 parts of butyl acrylate (BuA), 13 parts of methyl methacrylate (MMA) and 6 parts of ethylbenzene was prepared and, after adding t-butylperoxyisopropyl monocarbonate, as a polymerization initiator, in an amount of 0.025 parts based on 100 parts of the monomer mixture and n-dodecylmercaptane, as a chain transfer agent, in an amount of 0.03 parts based on 100 parts of the monomer mixture, the solution was continuously bulk-polymerized under the following conditions using the polymerization line shown in the flow chart in FIG. 3.

Reaction temperature in the stirring type reactor (2): 119° C.

Reaction temperature in the circulation polymerization line (I): 124° C.

Reaction temperature in the polymerization line (II): 150° C.

The mixed solution obtained by the polymerization was heated to 215° C. by a heat exchanger and, after removing the volatile component under reduced pressure, the polymerization solution was pelletized to obtain the desired styrene copolymer (A-4). Physical properties of the resulting styrene copolymer are shown in Table 1.

(Production of Styrene Copolymer (A-5))

In the same manner as in the case of the production of the styrene copolymer (A-1), except for adding 2,2-bis(4,4-di-peroxycyclohexyl)propane, as a polymerization initiator, in an amount of 0.025 parts based on 100 parts of the monomer mixture and n-dodecylmercaptane, as a chain transfer agent, in an amount of 0.03 parts based on 100 parts of the monomer mixture to a mixed solution of 82 parts of styrene (SM), 5 parts of butyl acrylate (BuA), 13 parts of methyl methacrylate (MMA) and 9 parts of ethylbenzene, a styrene copolymer (A-5) was obtained. Physical properties of the resulting styrene copolymer are shown in Table 1.

(Production of Styrene Copolymer (A-6))

A mixed solution of 82 parts of styrene (SM), 18 parts of butyl acrylate (BuA) and 9 parts of ethylbenzene was prepared and, after adding 2,2-bis(4,4-di-peroxycyclohexyl) propane, as a polymerization initiator, in an amount of 0.026 parts based on 100 parts of the monomer mixture, the solution was continuously bulk-polymerized under the following conditions using the polymerization line shown in the flow chart in FIG. 3.

Reaction temperature in the stirring type reactor (2): 115° C.

Reaction temperature in the circulation polymerization line (I): 132° C.

Reaction temperature in the polymerization line (II): 150° C.

The mixed solution obtained by the polymerization was heated to 215° C. by a heat exchanger and, after removing the volatile component under reduced pressure, the polymerization solution was pelletized to obtain the desired styrene copolymer (A-6). Physical properties of the resulting styrene copolymer are shown in Table 1.

[Production of Styrene Resin Compositions and Evaluation of Physical Properties]

(Styrene-butadiene-styrene block copolymer (B))

The styrene-butadiene-styrene block copolymers (B) used in the following respective examples and comparative examples are as follows.

Styrene-butadiene-styrene block copolymer (B1):

- SBS manufactured by Chevron Phillips Chemical Company under the trade name of "K Resin KR05"
- Content of a constituent unit derived from styrene: 75% by weight
- Content of a constituent unit derived from butadiene: 25% by weight
- MFR: 7 g/10 min Styrene-butadiene-styrene block copolymer (B2):

- SBS manufactured by Chevron Phillips Chemical Company under the trade name of "K Resin DK11"
- Content of a constituent unit derived from styrene: 75% by weight
- Content of a constituent unit derived from butadiene: 25% by weight
- MFR: 8 g/10 min Hereinafter, the styrene-butadiene-styrene block copolymers (B1) and (B2) are abbreviated to as a "block copolymer (B1)" and a "block copolymer (B2)", respectively.

(Measurement by $C^{13}$-NMR)

The contents of structural units derived from a conjugated diene monomer, structural units derived from a methyl methacrylate (c) and structural units derived from a butyl acrylate (b) in the styrene resin compositions obtained in the respective examples and comparative examples were measured in the following manner.

120 mg of each of samples obtained in the respective examples and comparative examples was dissolved in 0.5 ml of $CDCl_3$, mixed with about 5 mg of a relaxation agent, and then filled in a sample tube for measurement of NMR. Using NMR "GSX-400" manufactured by JEOL Ltd., quantitative $^{13}C$-NMR was performed by a gate-coupling method.

The content of each structural unit was determined from an area ratio of a chemical peak of the following carbon atoms.

Carbon atoms as a measuring object and chemical shift corresponding thereto

- Aromatic carbon atoms in the case of the structural units derived from styrene: 142 to 146 ppm
- Carbonyl carbon atoms in the case of the structural units derived from methyl methacrylate: 175 ppm
- Carbon atoms of a butyl group bonded with oxygen atoms in the case of the structural units derived from butyl acrylate: 63 ppm
- Terminal carbon atoms constituting a 1,2-vinyl group in the case of structural units (but-3-ene-1,2-diyl) derived from butadiene: 114 ppm
- Terminal carbon atoms in the case of structural units (but-2-ene-1,4-diyl) derived from butadiene: 125 to 132 ppm

[Method for Evaluation of Physical Properties]

Methods for evaluation of physical properties of the forming sheets in the following respective examples and comparative examples are as follows.

(Measurement of Haze)

According to JIS K7105, a Haze value, which indicates transparency of a 0.4 mm thick sheet test piece, was measured by a HAZE TURBIDIMETER (manufactured by Nippon Denshoku Industries Co., Ltd.).

(Measurement of DuPont Impact Strength)

Using a DuPont impact tester (manufactured by Toyo Seiki Seisaku-Sho, Ltd.), energy at 50% breaking of a 0.4 mm thick sheet test piece was measured under the conditions of a weight of 300 g, an impact head radius of 6.3 mm and a bearer radius of 6.3 mm.

(Measurement of Tensile Elasticity)

According to JIS K7161, tensile elasticity was measured at a test speed of 1 mm/min.

(Measurement of Melt Weight Flow Rate)

According to JIS K7210, a melt weight flow rate was measured at a temperature of 200° C. under a load of 5 Kgf.

(Test of Whitening on Bending)

A 0.4 mm thick sheet was bent by 180° and returned to an original state, and then the width of the whitened portion was measured by a caliper.

(Evaluation of Appearance of Sheet)

○: extruded sheet has no appearance defects such as fisheyes, hard spots, or sharkskin x: extruded sheet has appearance defects such as fisheyes, hard spots, or sharkskin (Evaluation of Heat Resistance)

A 0.4 mm thick sheet was molded into a box measuring 170×130×35 (mm) by a vacuum molding machine and the resulting molded article was left to stand in a constant-temperature bath at a temperature of 65° C. and a humidity of 80% for 8 hours, and then deformation of the molded article was confirmed.

○: molded article with no deformation x: molded article with some deformation (Measurement of Neck-in)

After measuring the width (W) of the extruded sheet, neck-in was calculated by the following equation:

$$\text{Neck-in (mm)}=W_0-W$$

where $W_0$ denotes a die width.

Example 1

A styrene copolymer (A-1) was mixed with a styrene-butadiene-styrene block copolymer (B1) in a proportion of (A-1)/(B1)=50/50 on a weight basis, and then the mixture was extruded to form a 0.4 mm thick sheet.

Using the resulting sheet, various physical properties were evaluated. The results are shown in Table 3. The molding conditions of the sheet were as follows.

Sheet forming machine: 30 mm extruder, Model UEV, manufactured by Union Plastic Co., Ltd.

Cylinder temperature: 210° C.

T-die set temperature: 210° C.

T-die lip width: 200 mm

Take-up speed: 1 m/min

Screw speed: 65 rpm

Example 2

A styrene copolymer (A-1) was mixed with a block copolymer (B2) in a proportion of (A-1)/(B2)=40/60 on a weight basis, and then a 0.4 mm thick sheet was formed under the same conditions as in Example 1 and various physical properties were evaluated. The results are shown in Table 2.

Example 3

A styrene copolymer (A-1) was mixed with a block copolymer (B2) in a proportion of (A-1)/(B2)=40/60, and then the mixture was extruded to form a 0.4 mm thick sheet on the extrusion conditions below, and various physical properties were evaluated. The results are shown in Table 2.

Sheet forming machine: 120 mm extruder manufactured by Hitachi Zosen Sangyo Co., Ltd.

Cylinder temperature: 210° C.

T-die set temperature: 210° C.

T-die lip width: 1030 mm

Take-up speed: 22 m/min

Screw speed: 60 rpm

In addition, after cutting out a portion of the sheet and staining with osmium tetraoxide, an ultra-thin section was made from the cross section in the direction of CD using an ultramicrotome, and then a transmission electron micrograph (TEM) was taken. The resulting transmission electron micrograph is shown in FIG. 1.

Example 4

A styrene copolymer (A-1) was mixed with a block copolymer (B2) in a proportion of (A-1)/(B2)=30/70 on a weight basis, and then a 0.4 mm thick sheet was formed under the same conditions as in Example 1 and various physical properties were evaluated. The results are shown in Table 2.

Example 5

A styrene copolymer (A-2) was mixed with a block copolymer (B1) in a proportion of (A-3)/(B1)=50/50 on a weight basis, and then a 0.4 mm thick sheet was formed under the same conditions as in Example 1 and various physical properties were evaluated. The results are shown in Table 2.

Example 6

A styrene copolymer (A-3) was mixed with a block copolymer (B1) in a proportion of (A-4)/(B1)=50/50 on a weight basis, and then a 0.4 mm thick sheet was formed under the same conditions as in Example 1 and various physical properties were evaluated. The results are shown in Table 2.

Example 7

A styrene copolymer (A-1) was mixed with a block copolymer (B1) and a styrene-butadiene block copolymer elastomer ("TR2003", manufactured by JSR Co.) having 43% by weight of styrene monomer constituent units and 57% by weight of butadiene monomer structural units in a proportion of (A-1)/(B1)/(TR2003)=40/50/10 on a weight basis, and then a 0.4 mm thick sheet was formed under the same conditions as in Example 1 and various physical properties were evaluated. The results are shown in Table 2.

Example 8

A styrene copolymer (A-4) was mixed with a block copolymer (B1) in a proportion of (A-4)/(B1)=50/50 on a weight basis, and then a 0.4 mm thick sheet was formed under the same conditions as in Example 1 and various physical properties were evaluated. The results are shown in Table 2.

Example 9

A styrene copolymer (A-5) was mixed with a block copolymer (B1) in a proportion of (A-5)/(B1)=50/50 on a weight basis, and then a 0.4 mm thick sheet was formed under the same conditions as in Example 1 and various physical properties were evaluated. The results are shown in Table 2.

Example 10

A styrene copolymer (A-1) was mixed with a block copolymer (B1) in a proportion of (A-5)/(B1)=40/60 on a weight basis, and then a 0.4 mm thick sheet was formed under the same conditions as in Example 1 and various physical properties were evaluated. The results are shown in Table 2.

Comparative Example 1

A styrene copolymer (A-6) was mixed with a block copolymer (B1) in a proportion of (A-6)/(B1)=40/60 on a weight basis, and then a 0.4 mm thick sheet was formed under the same conditions as in Example 1 and various physical properties were evaluated. The results are shown in Table 3.

Comparative Example 2

A styrene copolymer (A-6) was mixed with a block copolymer (B2) in a proportion of (A-6)/(B1)=40/60 on a weight basis, and then a 0.4 mm thick sheet was formed under the same conditions as in Example 1 and various physical properties were evaluated. The results are shown in Table 3.

Figure 2:
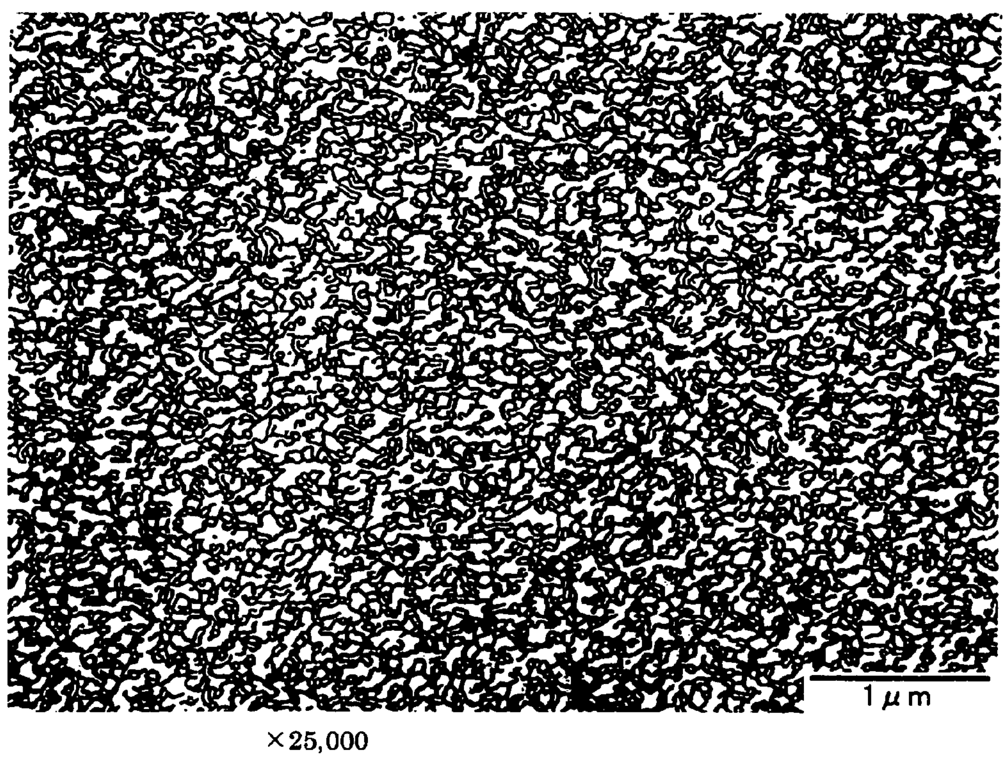
FIG. 2 is a transmission electron micrograph (TEM) of a styrene resin composition obtained in Comparative Example 2.

After cutting out a portion of the resulting sheet and staining with osmium tetraoxide, an ultra-thin section was made from the cross section in the direction of CD using an ultramicrotome, and then a transmission electron micrograph (TEM) was taken. The resulting transmission electron micrograph is shown in FIG. 2.

Comparative Example 3

A styrene copolymer (A-6) was mixed with a block copolymer (B2) in a proportion of (A-6)/(B1)=30/60 on a weight basis, and then a 0.4 mm thick sheet was formed under the same conditions as in Example 1 and various physical properties were evaluated. The results are shown in Table 3.

TABLE 1

| | Styrene copolymer | | | | | |
|---|---|---|---|---|---|---|
| | A-1 | A-2 | A-3 | A-4 | A-5 | A-6 |
| (a) Styrene (parts) | 82 | 82 | 82 | 87 | 76 | 82 |
| (b) BuA (parts) | 12 | 8 | 12 | 8 | 15 | 18 |
| (c) MMA (parts) | 6 | 10 | 6 | 5 | 9 | — |
| MFR (g/10 min) | 8.3 | 10.2 | 8.3 | 8.8 | 8.2 | 4.8 |
| Mw × $10^4$ | 26.8 | 22.3 | 25.2 | 25.0 | 27.0 | 38.2 |
| Haze of sheet (%) | 0.5 | 0.5 | 0.5 | 0.5 | 0.5 | 0.5 |

TABLE 2

| | Examples | | | | | | | | | |
|---|---|---|---|---|---|---|---|---|---|---|
| | 1 | 2 | 3 | 4 | 5 | 6 | 7 | 8 | 9 | 10 |
| Copolymer (A-1) | 50 | 40 | 40 | 30 | | | 40 | | | 40 |
| Copolymer (A-2) | | | | | 50 | | | | | |
| Copolymer (A-3) | | | | | | 50 | | | | |
| Copolymer (A-4) | | | | | | | | 50 | | |
| Copolymer (A-5) | | | | | | | | | 50 | |
| Block copolymer (B1) | 50 | | | | 50 | 50 | 50 | 50 | 50 | 60 |
| Block copolymer (B2) | | 60 | 60 | 70 | | | | | | |
| TR2003 | | | | | | | 10 | | | |
| Butadiene content % | 12.5 | 15 | 15 | 17.5 | 12.5 | 12.5 | 18.2 | 12.5 | 12.5 | 15 |
| MMA content % | 3.2 | 2.6 | 2.6 | 2.0 | 4.2 | 3.2 | 2.6 | 2.7 | 4.7 | 2.4 |
| BuA content % | 6 | 4.8 | 4.8 | 3.6 | 4 | 6 | 4.8 | 7.5 | 7.5 | 4.8 |
| Haze (%) | 2.4 | 2.34 | 2.26 | 3.51 | 3.2 | 3.2 | 3.5 | 12.0 | 15.0 | 3.09 |
| DuPont impact strength (J) | 1.3 | 0.69 | 0.81 | 0.98 | 1.0 | 0.9 | 1.52 | 1.2 | 1.1 | 0.92 |
| Tensile elasticity (Mpa) | 1590 | 1740 | 1570 | 1460 | 1620 | 1550 | 1480 | 1650 | 1560 | 1470 |
| Whitening on bending (mm) | 1.3 | 1.2 | 1.2 | 1.1 | 1.3 | 1.3 | 1.0 | 1.3 | 1.2 | 1.2 |
| Appearance of sheet | ○ | ○ | ○ | ○ | ○ | ○ | ○ | ○ | ○ | ○ |
| Heat resistance | ○ | ○ | ○ | ○ | ○ | ○ | ○ | ○ | ○ | ○ |
| Neck-in (mm) | 45 | 37 | — | 31 | 45 | 51 | 45 | 45 | 45 | 37 |

Note:
In the table, “TR2003” is a thermoplastic elastomer “TR2003”, manufactured by JSR Co. (styrene-butadiene block copolymer having 43% by weight of styrene monomer constituent units and 57% by weight of butadiene monomer structural units).

TABLE 3

| | Comparative Examples | | |
|---|---|---|---|
| | 1 | 2 | 3 |
| Copolymer (A-6) | 40 | 40 | 30 |
| Block copolymer (B1) | 60 | | |
| Block copolymer (B2) | | 60 | 70 |
| Butadiene content % | 15 | 15 | 17.5 |
| BuA content % | 7.2 | 7.2 | 5.4 |
| Haze (%) | 4.68 | 4.55 | 5.61 |
| DuPont impact strength (J) | 0.85 | 0.14 | 0.29 |
| Tensile elasticity (Mpa) | 1530 | 1810 | 1530 |

TABLE 3-continued

| | Comparative Examples | | |
|---|---|---|---|
| | 1 | 2 | 3 |
| Whitening on bending (mm) | 1.1 | 1.3 | 1.3 |
| Appearance of sheet | X | X | X |
| Heat resistance | X | X | X |
| Neck-in (mm) | 37 | 37 | 31 |

INDUSTRIAL APPLICABILITY

According to the present invention, it is made possible to remarkably improve surface impact strength in a molded article of a styrene resin composition and to improve the balance between the surface impact strength and the rigidity.

It is also made possible to avoid poor appearance due to whitening upon bending and impact in a forming sheet and to impart excellent transparency and excellent heat resistance to a secondarily formed article made from the forming sheet. Therefore, the styrene resin composition of the present invention is remarkably suitable for use in blister packs, trays for packing foods, cover materials, cups, various trays for storage, carrier tapes, and shrink films.

The invention claimed is:

1. A styrene resin composition comprising a styrene copolymer (A), and a block copolymer (B) comprising a polymer block (b1) of a styrene monomer and a polymer block (b2) of a conjugated diene monomer, wherein the styrene copolymer (A) is a copolymer of a styrene monomer (a), a butyl acrylate (b) and a methyl methacrylate (c), the block copolymer (B) has an alternative multi-layered structure comprising a layer of the polymer block (b1) and a layer of the polymer block (b2) of the diene monomer, and the styrene resin composition has, on a weight basis, 9 to 25% of structural units derived from the conjugated diene monomer, 2.8 to 9.5% of structural units derived from the butyl acrylate (b), and 1.5 to 6% of structural units derived from the methyl methacrylate (c), based on the total amount of the styrene resin composition.

2. The styrene resin composition according to claim 1, wherein the styrene copolymer (A) is a copolymer comprising 78 to 85% by weight of a styrene monomer (a), 6 to 19% by weight of a butyl acrylate (b), and 3 to 16% by weight of a methyl methacrylate (c), based on the total amount of the copolymer (A); and the block copolymer (B) contains 20 to 30% by weight of the polymer block (b2) of the conjugated diene monomer in the block copolymer (B), based on the total amount of the block copolymer (B).

3. The styrene resin composition according to claim 2, wherein the styrene copolymer (A) is a styrene copolymer having a weight average molecular weight of $25\times10^4$ to $35\times10^4$.

4. The styrene resin composition according to claim 1, wherein the block copolymer (B) composed of the polymer block (b1) of the styrene monomer and the polymer block (b2) of the conjugated diene monomer has a weight average molecular weight of 130,000 to 170,000 and a molecular weight distribution (Mw/Mn) of 1.3 to 1.7.

5. A forming sheet made of the styrene resin composition of claim 1.

6. A blister pack made of the styrene resin composition of claim 1.

* * * * *